(No Model.) 2 Sheets—Sheet 1.
H. G. ANDERSON.
PLOW OR CULTIVATOR.
No. 410,480. Patented Sept. 3, 1889.
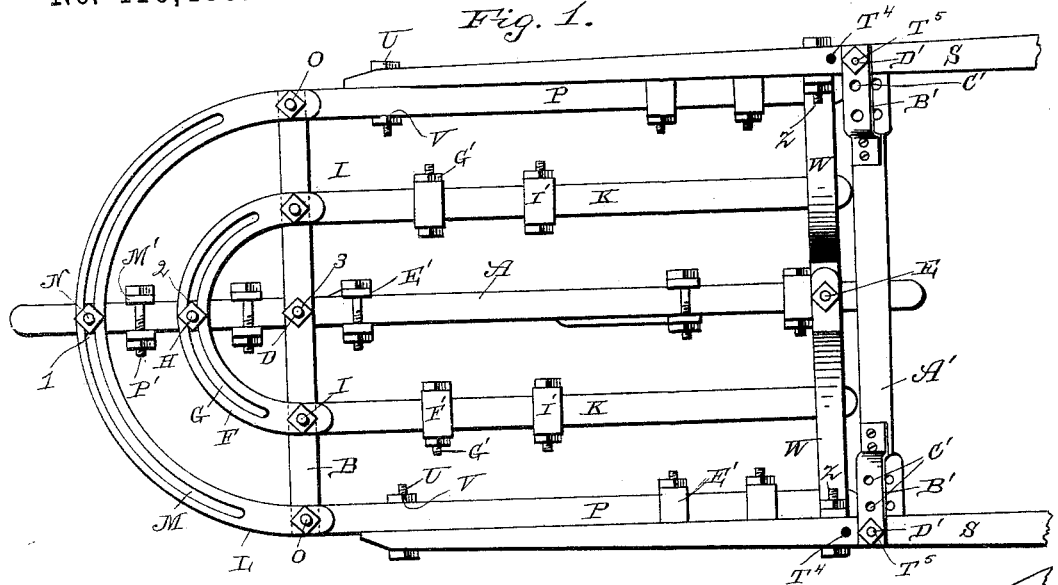
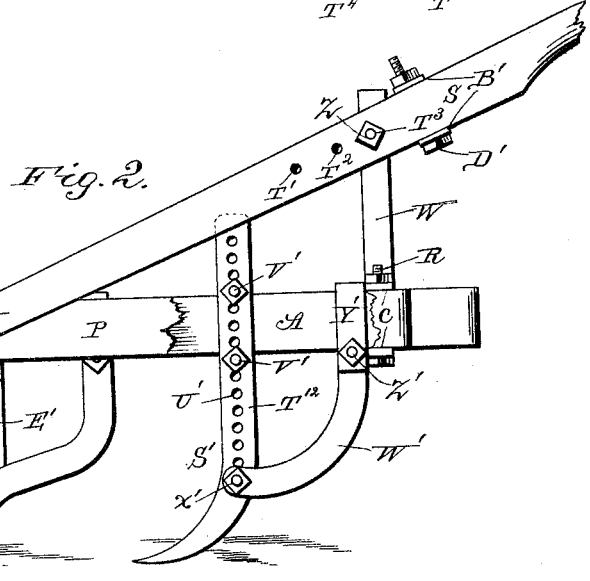
Witnesses
J. W. Garner
Chas. Beach
Inventor
Hugh G. Anderson
By his Attorneys
Freeman and Money

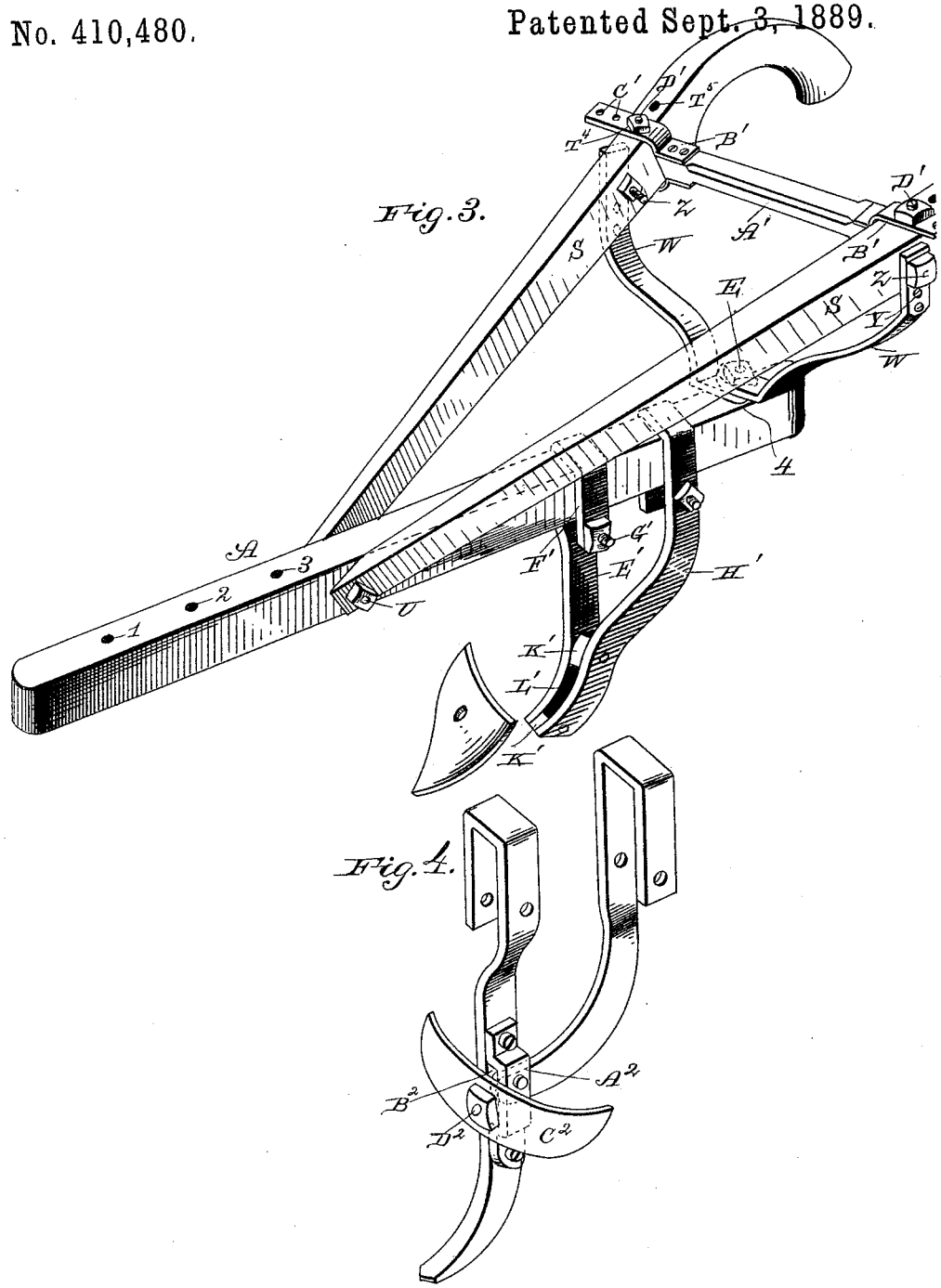

UNITED STATES PATENT OFFICE.

HUGH G. ANDERSON, OF BENELA, MISSISSIPPI.

PLOW OR CULTIVATOR.

SPECIFICATION forming part of Letters Patent No. 410,480, dated September 3, 1889.

Application filed April 29, 1889. Serial No. 309,012. (No model.)

*To all whom it may concern:*

Be it known that I, HUGH G. ANDERSON, a citizen of the United States, residing at Benela, in the county of Calhoun and State of Mississippi, have invented certain new and useful Improvements in Plows or Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in plows or cultivators; and it consists in the peculiar construction and combination of devices that will be more fully set forth hereinafter, and particularly pointed out in the claims.

The object of my invention is to provide an implement which is adapted for use for all the purposes of a plow and cultivator, and which is also adapted for use as a harrow, and which shall be cheap and simple, thoroughly reliable in operation, and very readily convertible into either a plow, cultivator, or harrow.

In the accompanying drawings, Figure 1 is a top plan view of my improved implement, showing the same adjusted for use as a cultivator. Fig. 2 is a side elevation of the same. Fig. 3 is a perspective view showing the implement adjusted for use as a single-shovel plow. Fig. 4 is a detailed perspective view of my improved subsoiling-plow.

The central longitudinal beam A is provided near its front end with a series of vertical openings 1 2 3, arranged at suitable regular distances apart, and the said beam has a similar vertical opening or bolt-hole 4 near its rear end.

Two pairs of bars B C are arranged under and over the central beam and are pivotally secured thereto by bolts D E, which pass through central openings in the said bars and through the openings 3 4, respectively. The bars B are arranged near the front end of the beam A, and the bars C are arranged near the rear end thereof.

A semicircular bar F has a curved slot G, through which extends a bolt H, that also passes through the opening 2, and thereby pivots the said curved bar to the beam A and permits the said bar to be moved in the direction of its length on the said pivot-bolt. The ends of the said bar are pivoted to the uppermost bar B, at a suitable distance from the ends thereof, by bolts I, which also serve to pivotally attach the front ends of a pair of beams K, that are parallel with and on opposite sides of the beam A. The rear ends of the beams K are pivotally bolted to the rear bars C.

A semicircular bar L, which is larger than the bar F and is concentric therewith, has a curved slot M, through which extends a bolt N, that passes through the opening 1 and thereby pivots the curved bar L also to the central beam and enables the said curved bar to be adjusted in the direction of its length.

Bolts O pivotally connect the ends of the curved bar L to the ends of the bars B, and also pivotally connect the front ends of the beams P to the said bars, the said beams P being arranged beyond and on the outer sides of the beams K and parallel with them and with beam A, and the rear ends of the said beams P are pivotally attached to the ends of the bars C by means of bolts R.

From the foregoing description it will be understood that by turning the bars B C on their central pivot-bolts the beams K P may be moved nearer to and farther from each other and to and from the central beam, so that the spaces between the said beams may be widened or narrowed, and thereby the width of the implement may be increased or decreased, and the cultivators or plows attached to the beams may be employed in cultivating rows of plants at any desired distance apart.

A pair of handles S are provided with bolt-holes T near their front ends and with a series of bolt-openings T', $T^2$, and $T^3$ at a suitable distance from their rear ends, and adjusting-openings $T^4$ $T^5$ are made vertically through the handles and slightly in rear of the openings T', $T^2$, and $T^3$.

Bolts U pass through the holes T in the front ends of the handles and through bolt-holes V in the beams P and secure the handles to said beams, and the rear ends of the handles are supported at any desired inclination by brace-arms W, which are curved, as shown, and have their inner ends overlapped and secured on the beam A by the bolt E X, that passes through the opening 4.

At the upper outer ends of the brace-arms are adjusting-openings Y, and bolts Z are passed through either of the said openings and through either of the openings $T'$ $T^2$ $T^3$, and thus support the said handles at any desired adjustment, and hence adapt the implement to be operated by persons of different heights with equal ease.

The cross-bar $A'$ is provided with extended arms $B'$ at its ends, bolted on its upper and lower sides, and the said arms bear upon the upper and lower sides of the handles and have adjusting-openings $C'$, adapted to register with the openings $T^4$ $T^5$. Bolts $D'$ pass through the said registering-openings, and thus cause the cross-bar to secure the handles at any desired distance apart.

To each of the parallel beams is secured one or any suitable number of standards $E'$, adapted to carry cultivating or turning plows or shovels of any suitable variety, and the said standards may be secured at any desired point on the beams, and thereby the implement is adapted for use as a gang-plow or for the cultivation of any kind of growing crops.

Each standard $E'$ has its upper end bent over the beam to form a keeper $F'$, which embraces both sides and the top of the beam, and a bolt $G'$ passes transversely through the depending portions of the keeper under the beam and serves to clamp the keeper firmly to the beam, and thereby rigidly secure the standard thereto.

Each standard $E'$ is further provided with a brace-arm $H'$, which extends rearward therefrom and has its upper end formed into a keeper $I'$, in all respects similar to the keeper of its standard, excepting that it is reversed with relation thereto—that is to say, the standard is on one side of the beam, while the brace-arm is on the opposite side thereof, as shown. The lower end of the brace-arm is bolted to the lower end of the standard, and blocks $K'$ are interposed between the said standard and brace-arm, thereby forming a vertical slot $L'$, through which the bolt to secure the plow or shovel to the standard is passed, and the said slot adapts the said bolt to be moved up or down, and thereby admits of the vertical adjustment of the plow on the standard.

Near the front end of the beam A, at a point about midway between the openings 1 2, is a colter-standard $M'$, which has a series of openings $N'$. The said standard bears against one side of the beam, and on the opposite side of the latter is a plate $O'$, arranged vertically, and also having openings $N'$, which correspond with those in the standard, and clamping-bolts $P'$ pass through aligned openings $N'$ above and below the beam and serve to thereby clamp the colter-standard very firmly thereto.

At the lower end of the standard is journaled a revolving colter or roller $R'$, which travels on the ground and regulates the depth at which the plows or shovels operate. The adjusting-openings $N'$ in the standard and plate and the clamping-bolts $P'$ adapt the colter-standard to be vertically adjusted, as will be very readily understood.

Harrow-teeth of any suitable construction may be attached to the beams, and when the intermediate beams are removed the outer beams may be arranged obliquely to the central beam and converging toward each other at either their front or rear ends, and the implement thereby adapted for the purposes of a harrow.

In Fig. 2 I illustrate a subsoil-plow $S'$, formed integral with the standard $T^{12}$, the latter being provided with adjusting-openings $U'$. A clamp-plate, such as before described in connection with the colter-standard, is used with the subsoil-plow, and the standard of the latter and the clamp-plate are secured on opposite sides of the beam by bolts $V'$, which pass through aligned openings in said standard and plate, and thereby the standard is rendered capable of vertical adjustment and the subsoil-plow adapted to operate at any desired depth in the soil.

A curved brace-arm $W'$ has its lower end pivotally connected to the standard $T^{12}$ by a bolt $X'$, that engages one of the openings in the said standard, and at the upper end of the said brace-arm is a keeper $Y'$, similar in construction to those on the plow or shovel standards and braces, and through which the beam passes. The brace-arm extends rearward from the standard $T^{12}$, and its keeper is clamped to the beam by a bolt $Z'$.

In Fig. 4 I illustrate a subsoil-plow having one of the before-described keepers at the upper end of its standard and having a plate $A^2$ bolted to one side thereof and offset to form a vertical slot $B^2$. The lower end of the brace-arm is pivotally bolted in the said slot.

On the front side of the subsoil-plow standard and arranged in a transverse position is a crescent-shaped wing $C^2$, which is curved in the direction of its length and has its ends turned rearward. This wing is useful in clearing away trash and also as a gage to regulate the depth at which the subsoil-plow operates when the same is used for cultivating purposes, and the said wing is secured on the standard by a bolt $D^2$, which passes through the slot $B^2$ and has an ordinary nut (not shown) on its rear end.

In Fig. 3 I illustrate my improved implement arranged for use as a single-shovel plow or cultivator. When thus arranged, the bars B C, the curved slotted bars, and the beams K P are removed, and the front ends of the handles bolted directly to the beam A. It will be observed that the position of the said handles is reversed when thus arranged, and that they bear against the inner sides of the upper ends of the brace-arms instead of against the outer sides thereof, as in Figs. 1 and 2.

An implement thus constructed is extremely cheap and simple, is very strong and durable, and will be found of great value to farmers, as it is adapted for a great variety of uses and renders it unnecessary to keep a number of various plows and cultivators on hand, as is now the practice.

By adjusting the standards on the outer beams, dispensing with the inner or intermediate beams, and attaching the appropriate scraping blades or shovels to the standards the implement is adapted for use as a scraper and will operate on both sides of a row of cotton-plants at the same time.

Having thus described my invention, I claim—

1. The convertible implement herein described for plowing, harrowing, and the like, comprising the central beam A, the cross-bars, the pivotal bolts D E, connecting the centers of the cross-bars to the beam A, the semicircular bars having the similarly-shaped slots and having their ends pivoted to the front cross-bar, the parallel beams P K, having their ends pivotally bolted to the cross-bars, the handles adapted to be attached to the center or outer bars, the brace-arms having their inner ends lapped and adjusted on cross-bars and handles, and the bar A', having its ends pivotally attached to the handles, substantially as described.

2. In a convertible implement for plowing, harrowing, and the like, the combination of the pivoted handles having the adjusting-openings $T'$ $T^2$ $T^3$ and the openings $T^4$ $T^5$ at right angles thereto, the bar A', to connect the handles, having the pairs of extended arms B' at its ends, provided with the openings C', to register with the openings $T^4$ $T^5$, for the purpose set forth, and the brace-arms having their upper ends vertical and plane, adapted thereby to lie flush against either the inner or outer sides of the handles, and provided with the adjusting-openings Y, to register with the openings $T'$ $T^2$ $T^3$, substantially as described.

In testimony whereof I affix my signature in presence of two witnesses.

HUGH G. ANDERSON.

Witnesses:
HERMAN D. MONEY,
CHAS. D. BEACH.